US011685243B2

(12) United States Patent
Bertholee (10) Patent No.: US 11,685,243 B2
(45) Date of Patent: Jun. 27, 2023

(54) NET WIND DEFLECTOR WITH FOLDING ANTI BUFFETING FLAP

(71) Applicant: Inalfa Roof Systems Group B.V., Oostrum (NL)

(72) Inventor: Jean-Marie Victoir Bertholee, Ortonville, MI (US)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 76 days.

(21) Appl. No.: 17/344,574

(22) Filed: Jun. 10, 2021

(65) Prior Publication Data

US 2022/0396133 A1 Dec. 15, 2022

(51) Int. Cl.
*B60J 7/22* (2006.01)
*B60J 7/043* (2006.01)

(52) U.S. Cl.
CPC . *B60J 7/22* (2013.01); *B60J 7/043* (2013.01)

(58) Field of Classification Search
CPC ............. B60J 7/22; B60J 7/043; B60J 7/0435
USPC .............................................. 296/217, 180.1
See application file for complete search history.

(56) References Cited

U.S. PATENT DOCUMENTS

| | | | | |
|---|---|---|---|---|
| 6,817,659 | B2* | 11/2004 | Vogel | B60J 7/22 296/217 |
| 7,025,413 | B2* | 4/2006 | Czechtizky | B60J 7/22 296/217 |
| 7,093,892 | B2* | 8/2006 | Karami | B60J 7/22 296/217 |
| 10,583,725 | B1* | 3/2020 | Brown | B60J 7/22 |
| 2018/0326828 | A1* | 11/2018 | Shoji | B60J 7/22 |

FOREIGN PATENT DOCUMENTS

| | | | | |
|---|---|---|---|---|
| DE | 19626937 A1 | * | 1/1998 | ............... B60J 7/22 |
| DE | 10335426 A1 | * | 1/2005 | ............... B60J 7/22 |

OTHER PUBLICATIONS

Kralik et al., "Sound-attenuator for car sun-roof", Publication: Jan. 8, 1998, Publisher: European Patent Office, Edition: DE-19626937-A1 (Year: 1998).*

(Continued)

*Primary Examiner* — Dennis H Redder
*Assistant Examiner* — Joyce Eileen Hill
(74) *Attorney, Agent, or Firm* — Steven M. Koehler; Westman Champlin & Koehler, P.A.

(57) ABSTRACT

An open roof construction for a vehicle comprises a movable panel in a fixed roof. A wind deflector assembly comprises a transverse deflector, which extends and retracts, and connects to a deflector arm on each end, the arms of which are pivotally connected to a stationary part. A biasing device engages each of the arms. The panel can push the deflector arms and therewith the deflector against the biasing force towards a retracted position. A valve assembly is pivotally connected to the deflector and comprises a valve body capable of extending above the deflector in an effective position when the deflector is in its extended position to generate turbulences in the air flow above the roof opening under driving conditions of the vehicle. The valve body is capable of being moved to a retracted position at least partly below the deflector when the deflector is moved towards its retracted position.

18 Claims, 8 Drawing Sheets

(56) References Cited

OTHER PUBLICATIONS

Hanke et al. "Wind deflector for a vehicle with a sliding roof is fitted with leaf springs and holding arms whose surfaces contacting parts of the sliding roof are provided with a plastic layer", Publication: May 1, 2005, Publisher: German and European Patent Offices, Edition: DE-10335426-A1 (Year: 2005).*

* cited by examiner

NET WIND DEFLECTOR WITH FOLDING ANTI BUFFETING FLAP

BACKGROUND

The discussion below is merely provided for general background information and is not intended to be used as an aid in determining the scope of the claimed subject matter.

The invention relates to an open roof construction for a vehicle.

A state of the art open roof construction is known to have a wind deflector assembly in front of the roof opening in the fixed roof of the vehicle. Such wind deflector assembly may comprise a wind deflector member which extends in a transverse direction of the vehicle and which is movable between a retracted position and an extended position. Such wind deflector member may be connected at both lateral ends to wind deflector arms which are pivotally connected to a stationary part. A biasing device may engage the wind deflector arms to bias the wind deflector member towards the extended position.

The open roof construction further may further comprise a panel, capable of opening and closing the roof opening, which panel when closing the roof opening, is capable of pushing the wind deflector arms and therewith the wind deflector member against the biasing force of the biasing device, towards a retracted position below the panel. The wind deflector assembly may further comprise a valve assembly connected to the wind deflector member, whereby the valve assembly may comprise a valve body, which may be capable of extending above the wind deflector member in an effective position when the wind deflector member is in its extended position. Such valve body may be able to generate turbulences in the air flow above the roof opening under driving conditions of the vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In one aspect of the invention the valve assembly may comprise a valve body being pivotally coupled to the wind deflector member. The valve body may be rotated from a position substantially upright or vertical in its effective position towards a position which is substantially horizontal or under an angle with the horizontal in its retracted position. The rotation of the valve body starts when the panel pushes the wind deflector arms in a downward direction and the rotation stops when the wind deflector arms no longer move in a downward direction. The valve body rotates in such a way that the panel, when approaching towards the closed position will not be obstructed by it.

In another aspect of the invention, the valve assembly further comprises an auxiliary lever, on a first end being coupled pivotally to the valve body by an upper auxiliary hinge and on a second opposite end being pivotally coupled to the stationary part by a lower auxiliary hinge. In case that the wind deflector arms, which are pivotally connected to the stationary part and therewith the wind deflector member, are pushed downwardly by the panel, the auxiliary lever pushes the lower end of the valve body into a forward direction of the vehicle and therewith the upper end of the valve body into a rearward direction of the vehicle. This movement of the valve body occurs because the valve body is pivotally connected to the wind deflector member and because the auxiliary lever has a length that is smaller than the length of the wind deflector arms.

According to one embodiment the wind deflector member comprises at least a locally circular cross sectional shaped area which forms the inner part of the pivotal connection between the wind deflector member and the valve body and wherein the opposite outer part of the pivotal connection is a hook member, connected to the valve body. This embodiment is especially beneficial when in a later phase, of the development of the open roof construction, it turns out that the aero-acoustic requirements are not fully met under driving conditions of the vehicle. This may be the case when a so-called booming phenomena occurs when the panel is in an open position, which is not possible to be reduced or be eliminated by the state of the art wind deflector assembly itself. In such case it may be beneficial to use a valve assembly which can be releasably attached to the wind deflector assembly as an add-on system. As such, this would avoid changing the tooling of the wind deflector assembly to solve the aero-acoustic problems in a late phase of the project and just industrialize an additional valve assembly, which may be placed on the wind deflector member as an add-on valve assembly.

According to another embodiment the valve body is connected to the wind deflector member by a hinge placed in the vicinity of a bottom end of the wind deflector member and wherein the valve body is able to rotate around the hinge. In case the use of the valve assembly becomes evident in the early phase of the development project of the open roof construction, it may be conceivable to design the hinge to the wind deflector member. In addition, it may be conceivable that the wind deflector member does not have a circular cross section but a substantially rectangular shaped cross section. In the latter case, the cross section of the wind deflector member is not suitable to be an inner part of the pivotal connection. Hence, the hinge may be placed to the lower end of the wind deflector member.

According to another embodiment the valve body and auxiliary lever are biased by a biasing member, biasing the valve body towards the effective position. It may be conceivable that the valve body in its effective position may be subjected to wind load, which may not be a constant force. In such case that the wind load is fluctuating, the fluctuating wind force may cause a vibrating valve body, which may cause noise. To avoid or reduce such vibration noise, a biasing member may be applied to pre load the valve body towards an effective position.

According to another aspect of the invention, a flexible screen permeable to air extends at least between the wind deflector member and the stationary part. Such a flexible screen being permeable to air may generate small turbulences in the air just above the roof opening in the fixed roof. Such creation of turbulences may be advantageous to improve the aero acoustic performance of the wind deflector assembly especially the so-called "booming" phenomena.

According to another embodiment, the valve body may be pivotally connected to a holder, which holder is releasable connected to the wind deflector member. In case the wind deflector member is of a substantial rectangular cross sectional shape, it may be advantageous to connect the valve body, with releasable holders, incorporating a hinge, to the wind deflector member. In such case, it would be feasible to add the valve assembly to the wind deflector assembly in a late phase of the development of the open roof construction.

According to another embodiment, one part of the hinge may be integrally connected to the wind deflector member. In case the wind deflector member is of a substantial rectangular cross sectional shape, and manufactured of a plastic injection moulded part, it may be advantageous to connect the valve body to the wind deflector member by a hinge made integrally to the wind deflector, whereby there is no need for a separate hinge part.

According to yet another embodiment one part of the hinge may be connected to a holder that further connects the flexible screen to the wind deflector member. In case the wind deflector assembly is provided with a flexible screen, which is connected to the wind deflector member by a holder, it may be advantageous to provide for a hinge on the holder. Such solution would create for a simple and cheap solution to establish a hinge function to operate the valve assembly.

According to another aspect of the invention the valve body extends along the wind deflector member, equally spaced in a lateral directions from a central vertical plane of the vehicle and has a width W in the range of about 80 mm to about 400 mm or more in particular in a range of about 120 mm to about 200 mm or more in particular with a width W of about 150 mm. The valve body, when in an effective position generates turbulences in the wind flow over the roof opening. Depending on the size of the roof opening the width W of the valve body shall be determined by aero-acoustic vehicle testing.

According to another aspect of the invention, the valve body extends above the wind deflector member in an effective position over a length H in the range of about 15 mm to about 80 mm or more in particular in a range between about 20 mm and about 55 mm or more in particular with a Height H of about 30 mm. Also regarding the height H of the valve body, the dimension shall be determined by aero-acoustic vehicle testing and here too the required height H depends on the size of the roof opening.

According to another aspect of the invention, the valve body is either of a solid material such as a plastic material or is made of a frame covered with a flexible air permeable material. The valve body may be impermeable to air, whereby the air, flowing along the edge of the valve body, causes turbulences in the air behind the valve body above the roof opening. However it is also conceivable that the valve body is permeable to air whereby the air flowing through the air permeable material causes small turbulences behind the valve body above the roof opening.

According to yet another embodiment, the upper edge of the valve body may comprise spaced apart projections in a form of a castellation. The castellation may cause additional turbulences in the airflow behind the valve body above the roof opening.

A vehicle may comprise the open roof construction according to above described aspects and/or features.

DETAILED DESCRIPTION OF THE ILLUSTRATIVE EMBODIMENTS

Figure 1:
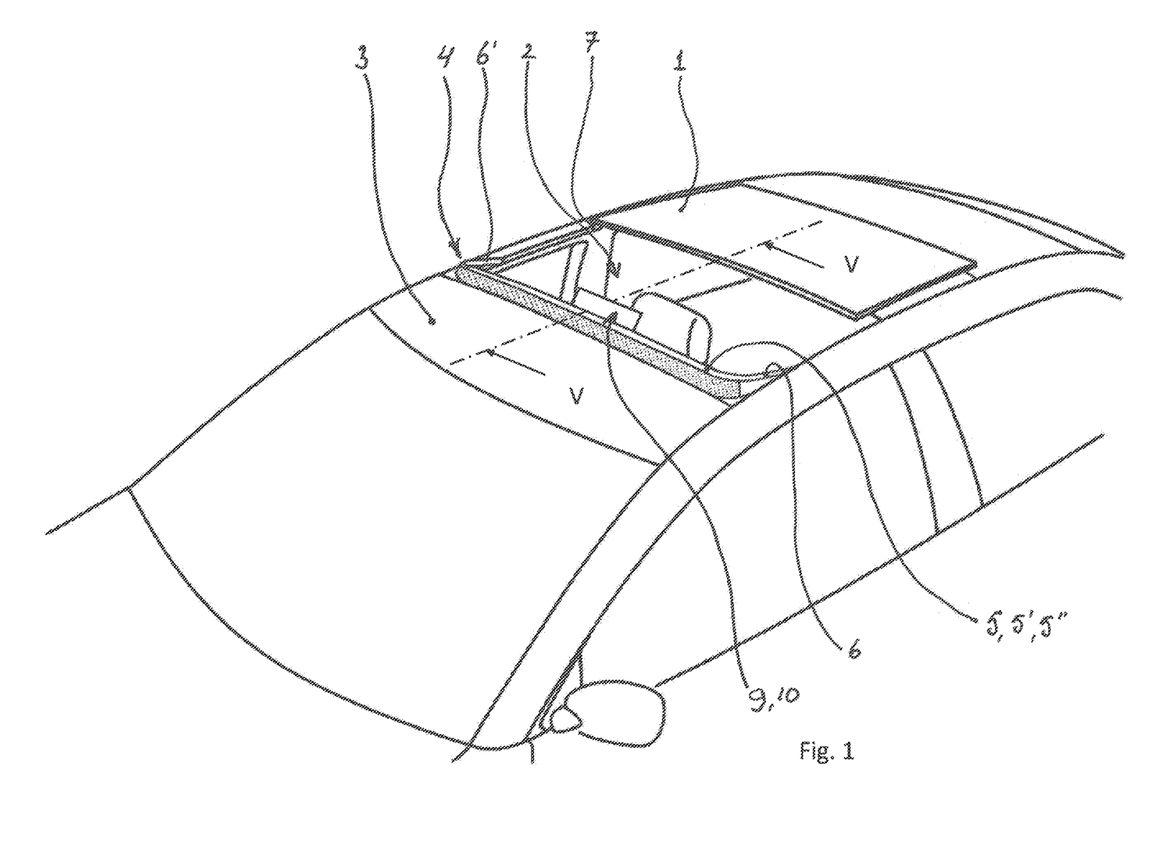
FIG. 1 is a schematic perspective view of a vehicle comprising the open roof construction.

Referring to FIG. 1 a vehicle is shown having a roof opening 2 in its fixed roof 3 and at least one panel 1 to close the roof opening 2 in the roof 3. The at least one panel 1 is part of the open roof construction. The open roof construction may comprise two or more panels 1 closing the roof opening 2 in the roof 3, whereby the frontal panel 1 usually is a panel which is capable of being opened and closed and the rearward panel(s) 1 are usually fixed panels. Nevertheless the rear panels 1 may be openable too. The frontal panel 1 may be openable by a pair of mechanisms, each mechanism on one end attached to a lower side of the frontal panel 1 and on a second end slidably engaged with the stationary part 7. The stationary part 7 is a frame part which is attached to the vehicle body. The open roof construction further comprises a wind deflector assembly 4. The wind deflector assembly 4 shown in FIG. 1 is shown in its effective position whereby the wind deflector assembly 4 extends above the fixed roof 3 and whereby the frontal panel 1 is in its open position. In this effective position the wind deflector assembly 4 is capable of deflecting the wind stream, caused by the moving vehicle, over the roof opening 2 in the fixed roof 3 in such a way that aero-acoustic noises are suppressed to an acceptable level. The wind deflector assembly 4 is capable of being moved to its retracted position, when the frontal panel 1 is being moved towards the front of the roof opening 2, to its closed position. The retracted position of the wind deflector assembly 4 is below the frontal panel 1 when it is in its closed position. As known in the art, the frontal panel 1 is equipped with slide pads, (not shown) that slide over the wind deflector arms 6, 6' of the wind deflector assembly 4 when the panel 1 moves to its closed position. Further the wind deflector member 5, 5', 5" and there with the other parts that make the wind deflector assembly 4 are pushed in a down ward direction against the biasing force of, in the embodiment illustrated, a pair of biasing devices 8,8' comprising separate leaf springs connected to the lower side of the arms 6, 6' and supported by the stationary part 7, to the retracted position. The wind deflector arms 6, 6' may be solid arms that are connected and integrated to the wind deflector member 5, 5', 5" or may be a leaf spring thereby having integral biasing devices 8,8' in each arm 6,6'. In another embodiment, at least one spring (such as but not limited to a torsion spring in a manner similar to torsion spring 17 described below) may be connected with one end or arm of the spring connected to the wind deflector member 5,5',5" and/or one or both arms 6,6' and the other arm or end of the spring connected to the stationary part 7 to provide the biasing force.

It is known in the art that when the design of the open roof construction provides for a small to moderate sized opening 2 in the roof 3 seen in the length of the vehicle, the wind deflector assembly 4 may be capable to provide an acceptable aero-acoustic performance for the occupants in the vehicle. Nevertheless there is a tendency in open roof construction developments, to create large openings 2 in the fixed roof 3, having at least two or even more panels. In such case the wind deflector assembly 4 may not be capable to arrange for an acceptable aero-acoustic performance. To solve this problem the valve assembly 9 may improve the aero-acoustic performance. In FIG. 1 the valve assembly 9 is shown mounted on the wind deflector member 5,5',5" and protrudes in upward direction whereby the angle of the valve body 10 may be substantially vertical or may have an angle with the vertical such that the valve body 10 is oriented upward and rearward. The valve assembly 9 is positioned laterally in the middle of the wind deflector assembly 4 and its centerline lies on the centerline of the vehicle.

Figure 2:
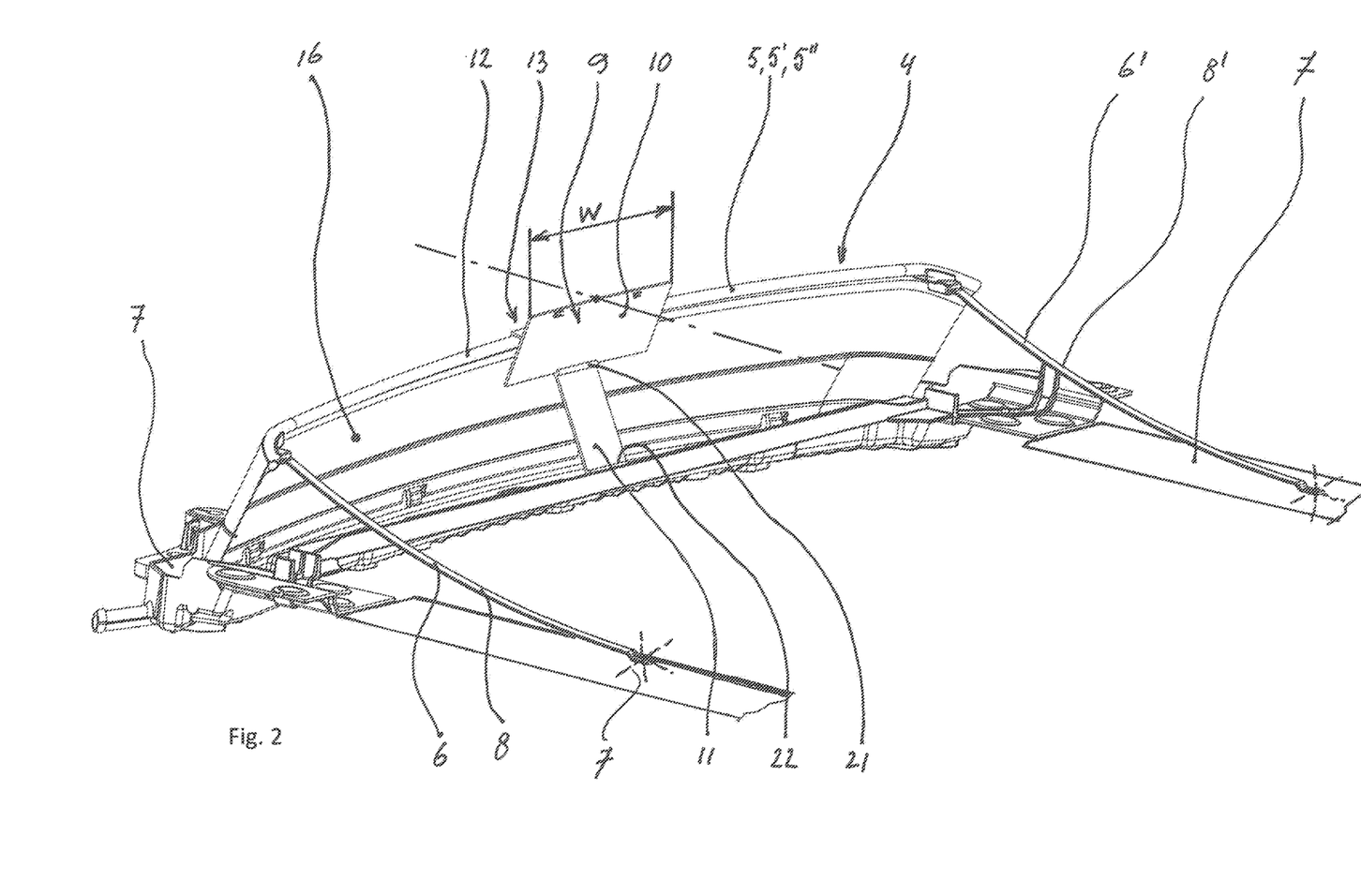
FIG. 2 is a perspective view of a part of the open roof construction showing the wind deflector assembly.

In FIG. 2 the wind deflector assembly 4 in its effective position is shown in perspective view seen from the rear. The wind deflector arms 6, 6' in this embodiment are made of leaf springs and as such form a pivotal connection to the stationary part 7 and apply an upward biasing force to the wind deflector member 5. The wind deflector member 5 in this embodiment has a circular shape. A wind deflector flexible screen 16 is tensioned between the upper wind deflector member 5 and the lower positioned stationary part 7. The valve assembly 9 is positioned on top of the wind deflector member 5 by a pair of hook members 13, 13'. These hook members 13, 13' together with the circular shaped upper wind deflector member 5 act as a hinge and as such allow the valve body 10 to rotate around the wind deflector member 5. The valve body 10 on its lower end is pivotally connected to the auxiliary lever 11 and this lever 11 is in turn pivotally connected to the stationary part 7.

Figure 3:
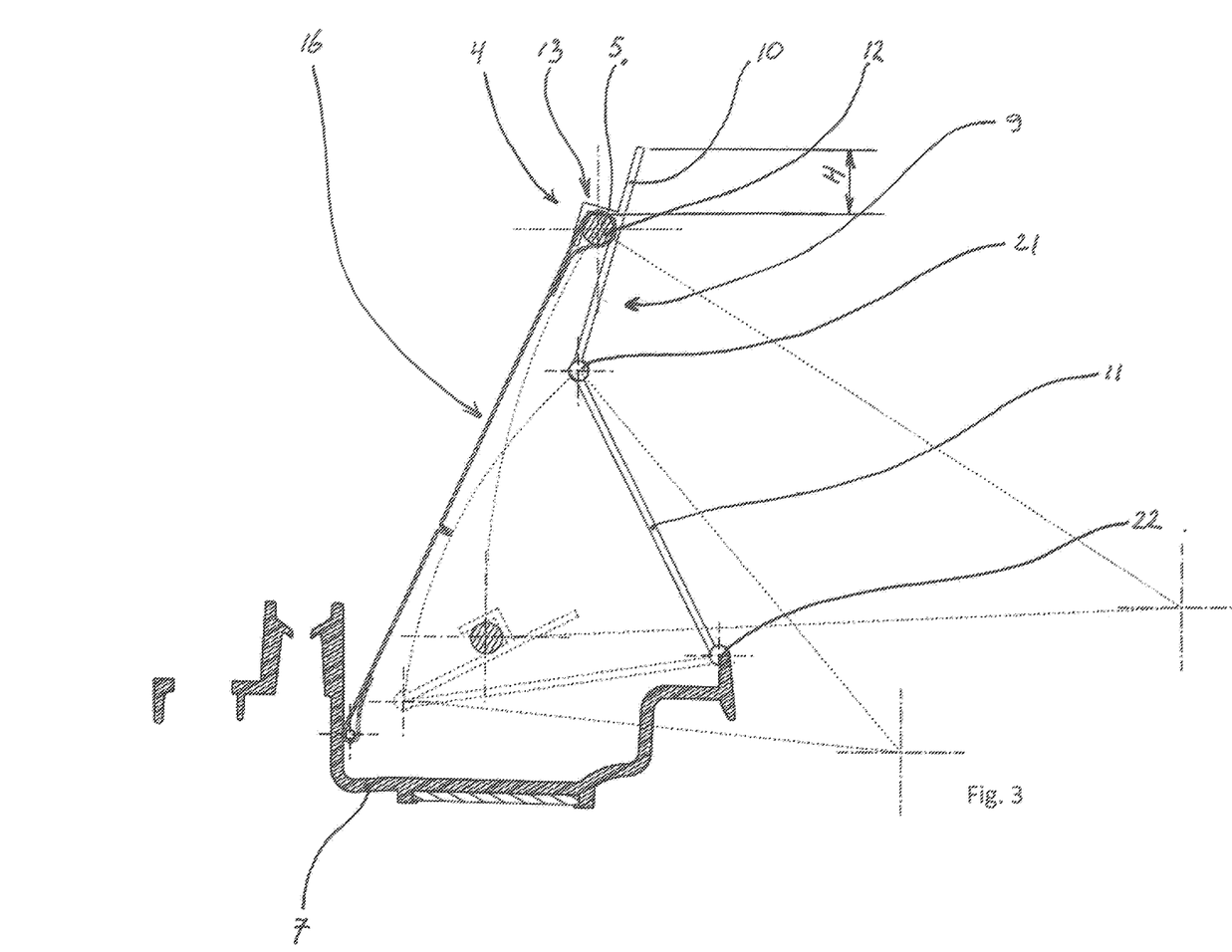
FIG. 3 is a cross sectional view of a first embodiment of the wind deflector assembly according to line V-V in FIG. 1, showing in solid lines an effective position and in dotted lines a retracted position.

FIG. 3 discloses a cross sectional view along the line V-V in FIG. 1. In this figure the movement of the valve assembly 9 and the wind deflector member 5 is shown in more detail. The wind deflector member 5 comprises at least a locally circular cross sectional shaped area 12 which forms an inner part of the pivotal connection between the wind deflector member 5 and the valve body 10 and wherein the an opposite outer part of the pivotal connection is a hook member 13 connected to the valve body 10. When the wind deflector arms 6, 6' are moved in a downward direction by the panel 1, the wind deflector member 5 attached to the wind deflector arms 6, 6' is moved accordingly. The valve body 10 attached to the wind deflector member 5 moves along downwardly and at the lower side the valve body 10 is connected to the auxiliary lever 11, which rotates around its lower auxiliary hinge 22 with the stationary part 7. Because the upper auxiliary hinge 21 between the valve body 10 and the auxiliary lever 11 is positioned below the wind deflector member 5, the valve body 10 rotates around its pivot with the wind deflector member 5 and thus is rotated with its upper part towards the rear and its lower part to the front. As such the valve body 10 rotates towards a substantial horizontal position.

Figure 4:
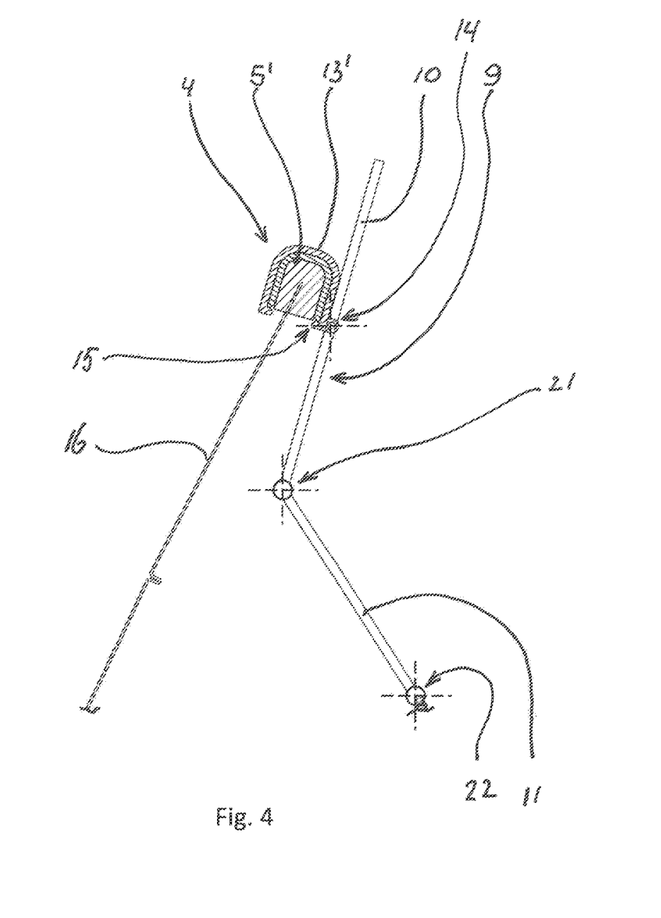
FIGS. 4, 5, 9 are a cross sectional views of further embodiments of the wind deflector assembly according to line V-V in FIG. 1.

FIG. 4 discloses another embodiment of the wind deflector member 5' and the connection of the valve assembly 9 to the wind deflector member 5'. The hook member 13' has a shape corresponding with the outer shape of the wind deflector member, which in this case does not have a circular shape but a substantial rectangular shape. The hook member 13' is provided with a hinge 14 placed in a vicinity of a bottom end 15 of the wind deflector member 5' around which the valve body 10 may rotate. The hook member 13' is provided with little hooks with which the hook member 13' is clamped around the wind deflector member 5'. The functional movements that the valve assembly 9 makes from an effective upward position towards a retracted position are substantially the same as shown in FIG. 3.

Figure 5:
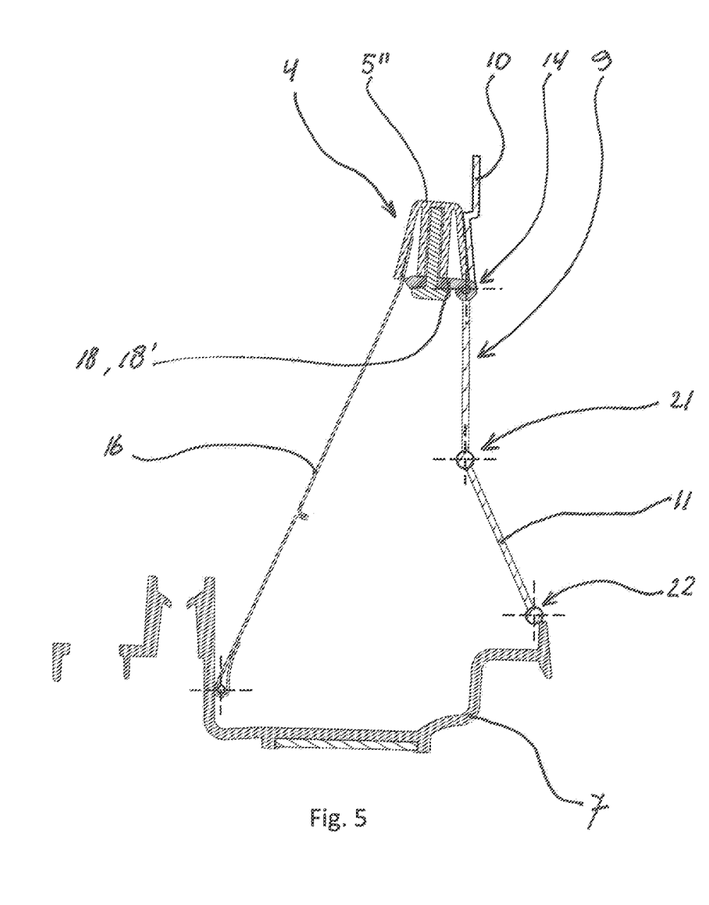

FIG. 5 shows yet another embodiment of the wind deflector member 5' and the connection of the valve assembly 9 towards the wind deflector member 5'. The holder 18 is a part that connects the flexible screen 16 to the wind deflector member 5'. It is a piece of flat material, for instance a steel plate, which is connected to the wind deflector member 5', by fixing material, for instance screws. The holder 18 is further equipped with hinge 14, around which the valve body 10 may rotate. The functional movements that the valve assembly 9 makes from an effective upward position towards a retracted position are substantially the same as shown in FIG. 3.

Figure 6:
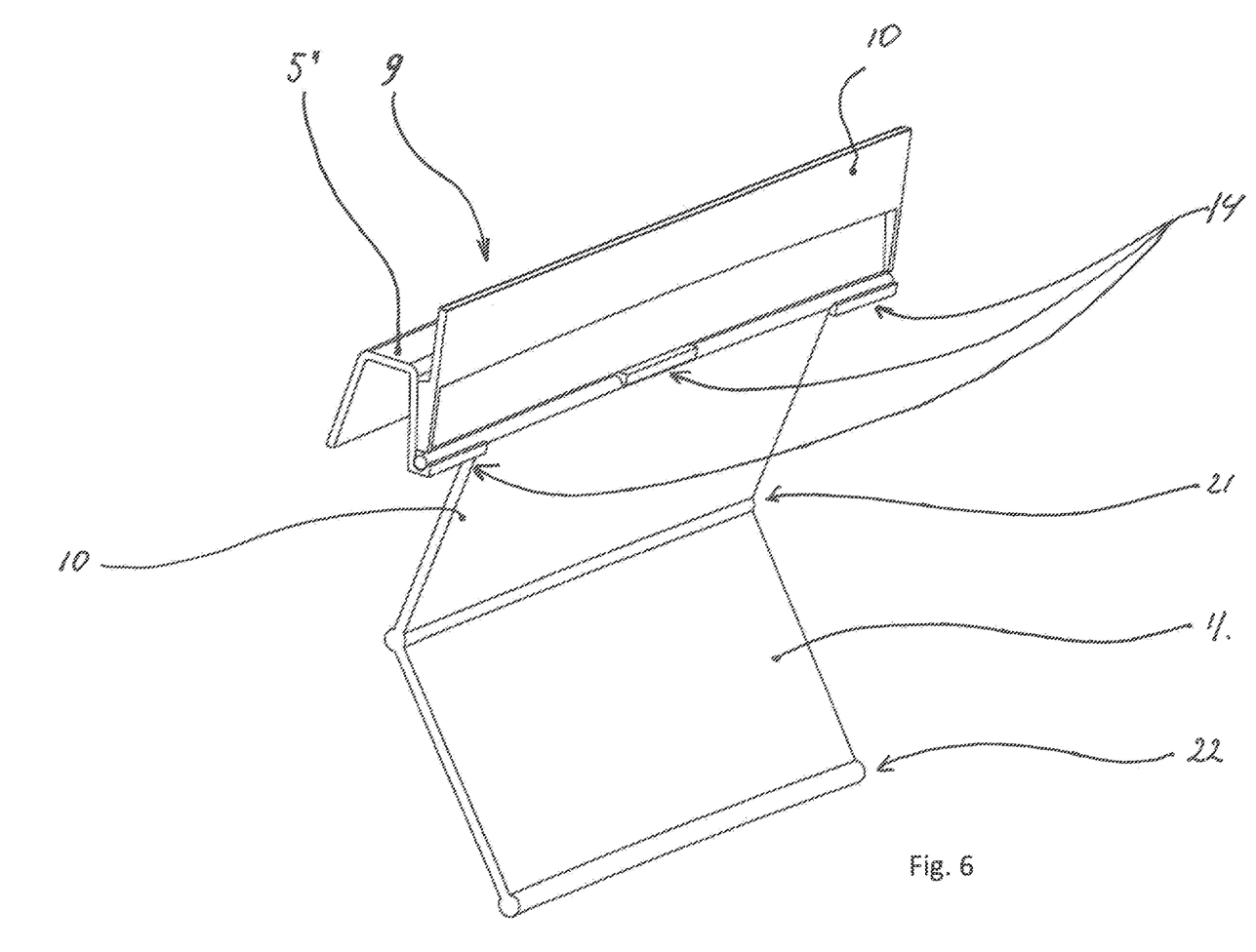
FIGS. 6, 7, 8 are perspective views of further embodiments of the wind deflector assembly.

FIG. 6 shows an isolated perspective view of yet another embodiment of the valve assembly 9 whereby the pivotal connection of the valve body 10 to the wind deflector member 5" is formed by a hinge 14 which is part of the wind deflector member 5" and is formed as such in the manufacturing tool of the injection moulded wind deflector member 5". In this case the hinge 14 exist of a series (in this case 3) of hooks that are formed in such a way that they are open in the tooling direction. In the embodiment shown two outer hooks are open at the upper side and the centre hook is open at the lower side. The axis shaft formed at the valve body 10 is taken up and supported by these hooks.

Figure 7:
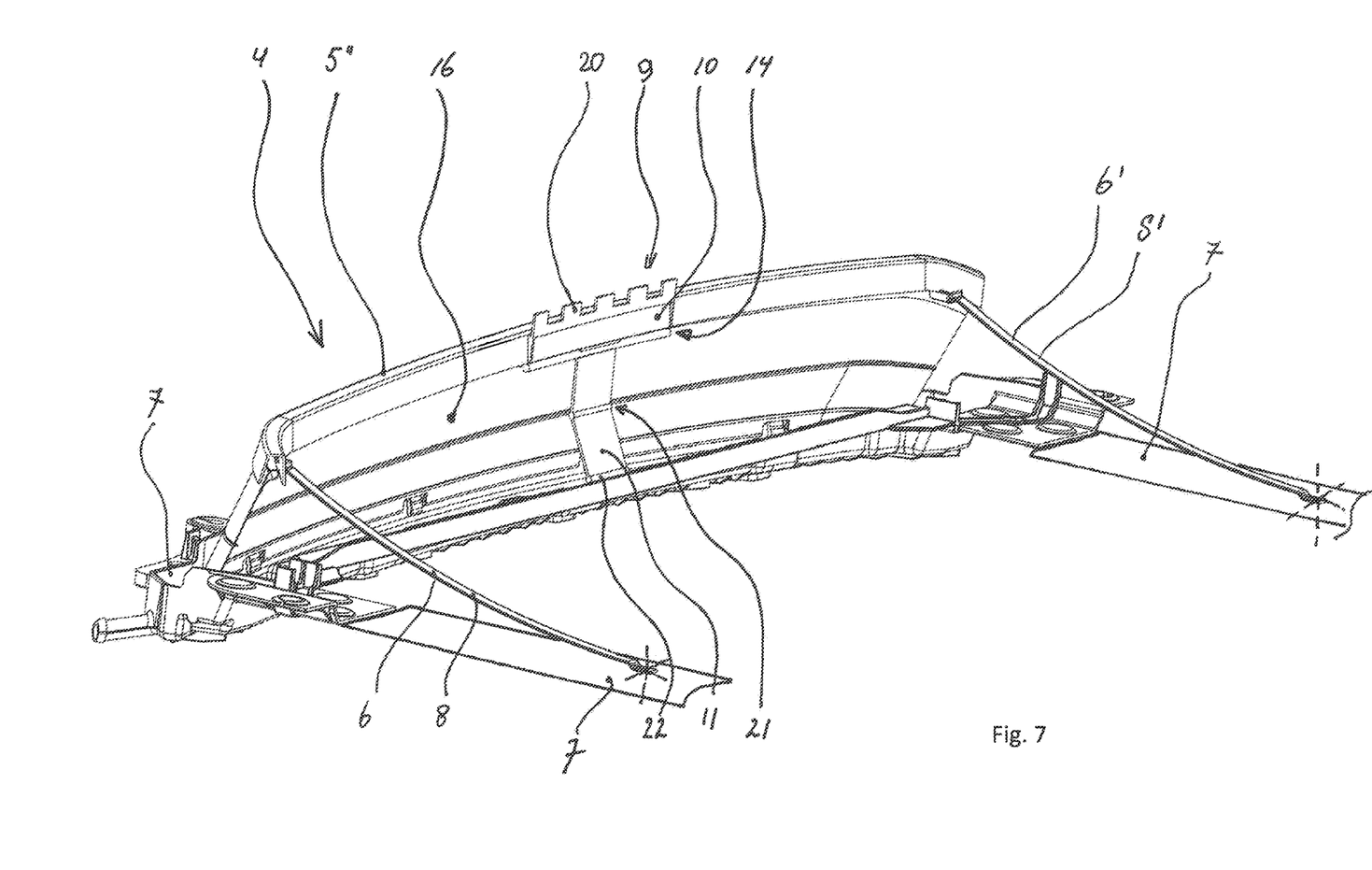

FIG. 7 shows a perspective view of the wind deflector assembly 4 with another embodiment, whereby the valve body 10 is equipped with spaced apart projections in the form of a castellation 20. The castellation 20 may generate additional turbulences behind the valve body 10 in the wind stream above the roof opening 2, which may reduce the level of aero-acoustic noise.

Figure 8:
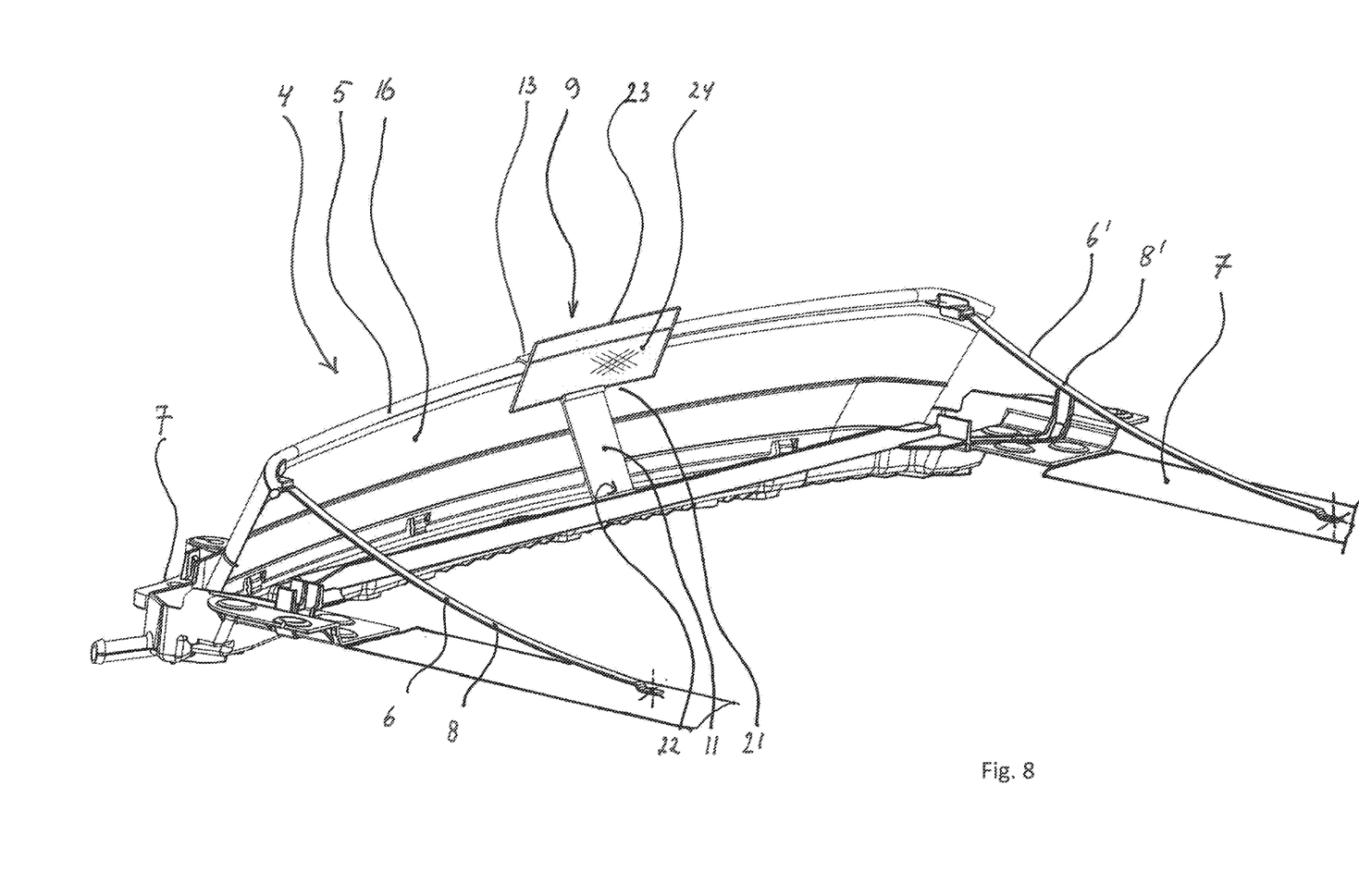

FIG. 8 shows a perspective view of the wind deflector assembly 4 with yet another embodiment, whereby the valve body 10 is made of a frame 23, and whereby a flexible air permeable material 24 extends between the four sides of the frame 23.

Figure 9:
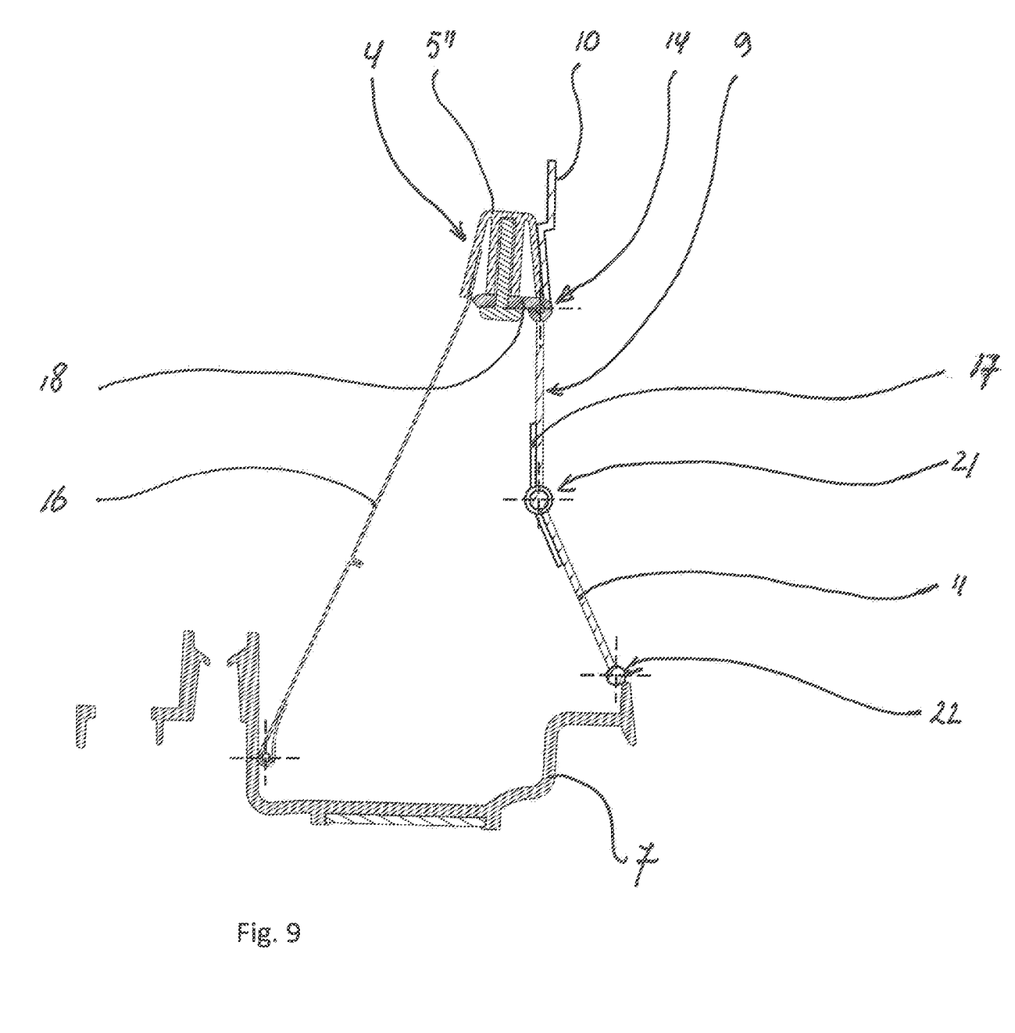

FIG. 9 discloses another embodiment of the invention, whereby a biasing member 17 is applied in the upper auxiliary hinge 21 between the auxiliary lever 11 and the valve body 10. The biasing member 17 applies a force between the auxiliary lever 11 and the valve body 10 in such away that the biasing force urges the valve body 10 to the upward direction. The biasing member 17 may be a torsion spring, whereby the respective legs of the spring are attached to the valve body 10 and the auxiliary lever 11.

Aspects of the invention are not limited to the embodiments described before which may be varied widely within the scope of the invention as defined in the appended claims.

What is claimed is:

1. An open roof construction for a vehicle, comprising:
   a panel configured to close and at least partly open a portion of a roof opening in a fixed roof of the vehicle;
   a wind deflector assembly configured to mount in front of the roof opening comprising:
   a wind deflector member which extends in a transverse direction of the vehicle and which is movable between a retracted position and an extended position;
   a pair of wind deflector arms, the wind deflector arms being on opposite lateral ends of the wind deflector member, wherein a first end of each wind deflector arm connects to one of the lateral ends and a second end is connectable to a stationary part of the fixed roof, the first ends of the wind deflector arms and the wind deflector member being biased by at least one spring towards the extended position with a biasing force, wherein the panel, when closing the roof opening, is configured to push the wind deflector arms and therewith the wind deflector member against the biasing force of the spring, towards a retracted position below the panel; and a valve assembly connected to the wind deflector member, the valve assembly comprising a valve body pivotally coupled to the wind deflector member and configured to extend above the wind deflector member in an effective position when the wind deflector member is in the extended position to generate turbulences in air flow above the roof opening under driving conditions of the vehicle, and configured to move to a retracted position at least partly below the wind deflector member when the wind deflector member is moved towards the retracted position, wherein the valve assembly further comprises an auxiliary lever, on a first end being coupled pivotally to the valve body by an upper auxiliary hinge and on a second opposite end being pivotally coupled to the stationary part by a lower auxiliary hinge.

2. The open roof construction for a vehicle according to claim 1 wherein the valve body is connected to the wind deflector member by a hinge placed in a vicinity of a bottom end of the wind deflector member and wherein the valve body is configured to rotate around the hinge.

3. The open roof construction for a vehicle according to claim 1 wherein the valve body and the auxiliary lever are biased by a biasing member, biasing the valve body towards the effective position.

4. The open roof construction for a vehicle according to claim 1 wherein a flexible screen, permeable to air, extends at least between the wind deflector member and the stationary part.

5. The open roof construction for a vehicle according to claim 2 wherein one part of the hinge is integrally connected to the wind deflector member.

6. The open roof construction for a vehicle according to claim 2 wherein a flexible screen, permeable to air, extends at least between the wind deflector member and the stationary part, and wherein one part of the hinge is connected to holder that further connects the flexible screen to the wind deflector member.

7. The open roof construction for a vehicle according to claim 1 wherein the valve body extends along the wind deflector member, equally spaced in lateral directions from a central vertical plane of the vehicle and has a width W in a range of about 80 mm to about 400 mm.

8. The open roof construction according to claim 7 wherein the width W is in the range of about 120 mm to about 200 mm.

9. The open roof construction according to claim 8 wherein the width W is about 150 mm.

10. The open roof construction for a vehicle according to claim 1 wherein the valve body extends above the wind deflector member in an effective position over a length H in a range of about 15 mm to about 80 mm.

11. The open roof construction for a vehicle according to claim 10 wherein the length H is the range of about 20 mm to about 55 mm.

12. The open roof construction for a vehicle according to claim 11 wherein the length H is about 30 mm.

13. The open roof construction for a vehicle according to claim 1 wherein the valve body is either of a solid material such as a plastic material or is made of a frame covered with a flexible air permeable material.

14. The open roof construction for a vehicle according to claim 1 wherein an upper edge of the valve body comprises spaced apart projections in a form of a castellation.

15. The open roof construction for a vehicle according to claim 1 wherein each of the arms comprise a leaf spring.

16. An open roof construction for a vehicle, comprising:
a panel configured to close and at least partly open a portion of a roof opening in a fixed roof of the vehicle;
a wind deflector assembly configured to mount in front of the roof opening comprising:
   a wind deflector member which extends in a transverse direction of the vehicle and which is movable between a retracted position and an extended position;
   a pair of wind deflector arms, the wind deflector arms being on opposite lateral ends of the wind deflector member, wherein a first end of each wind deflector arm connects to one of the lateral ends and a second end is connectable to a stationary part of the fixed roof, the first ends of the wind deflector arms and the wind deflector member being biased by at least one spring towards the extended position with a biasing force, wherein the panel, when closing the roof opening, is configured to push the wind deflector arms and therewith the wind deflector member against the biasing force of the spring towards a retracted position below the panel; and
a valve assembly connected to the wind deflector member, the valve assembly comprising a valve body pivotally coupled to the wind deflector member and configured to extend above the wind deflector member in an effective position when the wind deflector member is in the extended position to generate turbulences in air flow above the roof opening under driving conditions of the vehicle, and configured to move to retracted position at least partly below the wind deflector member when the wind deflector member is moved towards the retracted position, and wherein wind deflector member comprises at least a locally circular cross sectional shaped area which forms an inner part of a pivotal connection between the wind deflector member and the valve body and wherein an opposite outer part of the pivotal connection is a hook member connected to the valve body.

17. The open roof construction for a vehicle according to claim 16 wherein a flexible screen, permeable to air, extends at least between the wind deflector member and the stationary part.

18. An open roof construction for a vehicle, comprising
a panel configured to close and at least partly open a portion of a roof opening in a fixed roof of the vehicle;
a wind deflector assembly configured to mount in front of the roof opening comprising:
   a wind deflector member which extends in a transverse direction of the vehicle and which is movable between a retracted position and an extended position;
   a pair of wind deflector arms, the wind deflector arms being on opposite lateral ends of the wind deflector member, wherein a first end of each wind deflector arm connects to one of the lateral ends and a second end is connectable to a stationary part of the fixed roof, the first ends of the wind deflector arms and the wind deflector member being biased by at least one spring towards the extended position with a biasing force, wherein the panel, when closing the roof opening, is configured to push the wind deflector arms and therewith the wind deflector member against the biasing force of the spring, towards a retracted position below the panel; and
   a valve assembly connected to the wind deflector member, the valve assembly comprising a valve body configured to extend above the wind deflector member in an effective position when the wind deflector member is in the extended position to generate turbulences in air flow above the roof opening under driving conditions of the vehicle, and configured to move to a retracted position at least below the wind deflector member when the wind deflector member is moved towards the retracted position, wherein the valve body is pivotally connected to a holder, which holder is releasably connected to the wind deflector member.

* * * * *